May 23, 1961      A. M. STONER      2,985,454

CHUCK

Filed June 14, 1960      2 Sheets-Sheet 1

INVENTOR
ARTHUR MERRICK STONER
BY Raymond W Cotton
ATTORNEY

May 23, 1961    A. M. STONER    2,985,454
CHUCK
Filed June 14, 1960    2 Sheets-Sheet 2
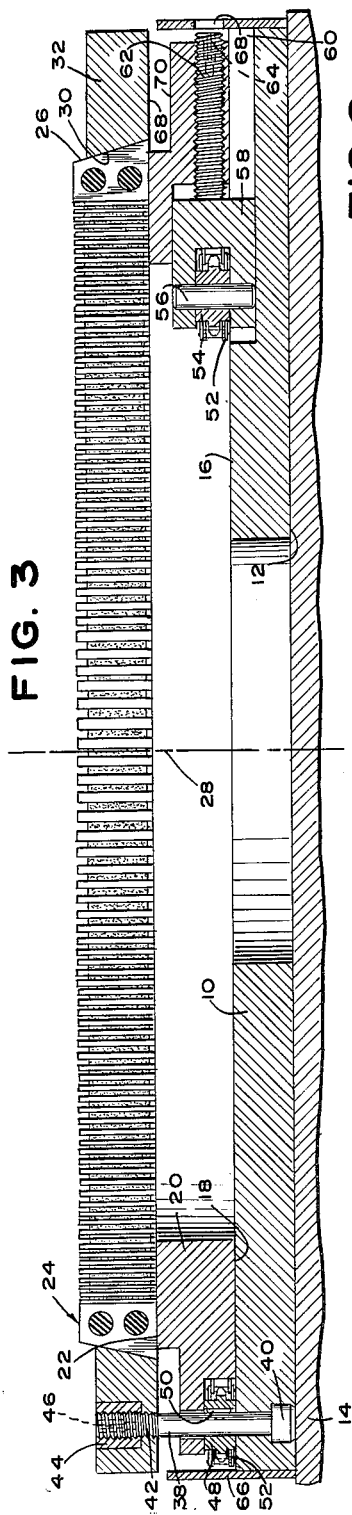
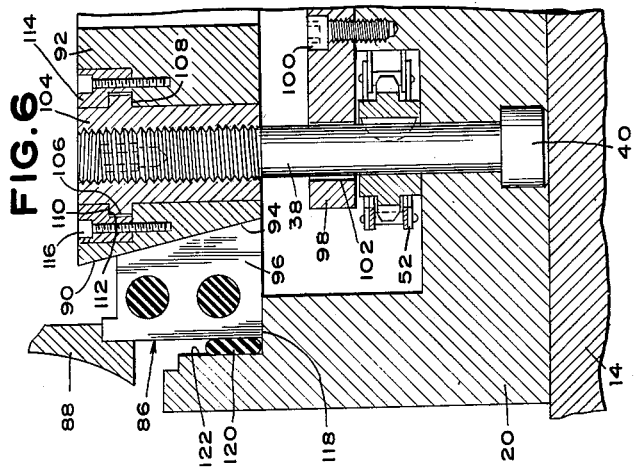
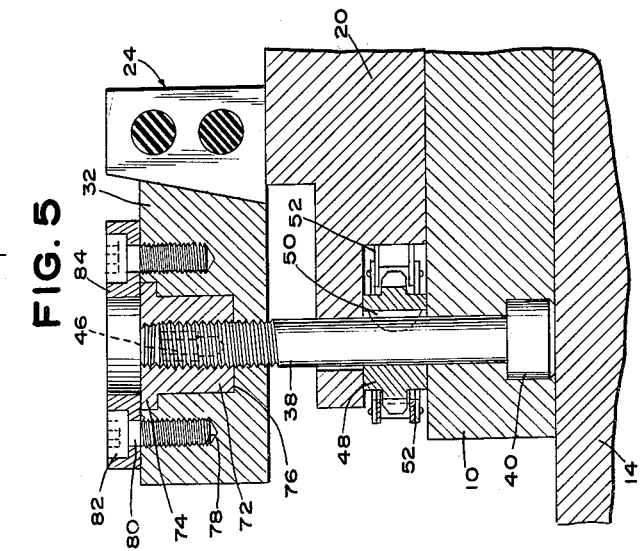
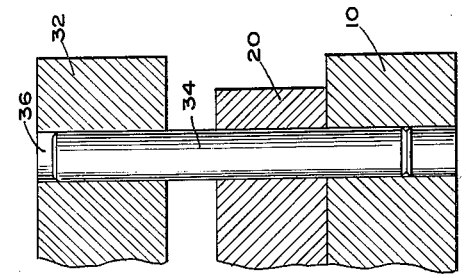
INVENTOR
ARTHUR MERRICK STONER
BY Raymond W. Colton
ATTORNEY

2,985,454
CHUCK

Arthur M. Stoner, Madison, Conn., assignor to The Jacobs Manufacturing Company, West Hartford, Conn., a corporation of New Jersey Filed June 14, 1960, Ser. No. 35,957

19 Claims. (Cl. 279—2)

This invention relates to chucks and particularly to multiple screw actuated chucks.

In a copending application Serial No. 854,432, filed on November 20, 1959, examples of chucks embodying multiple screw actuation have been disclosed. In accordance with the present invention, it is proposed that such screws be actuated simultaneously by means of a flexible driving element interconnecting the screws. In this way, it becomes feasible to produce chucks in small numbers at a unit cost far less than is experienced where special ring gears are required. Accordingly, the present invention lends itself to the production of relatively large chucks to accommodate work up to several feet in diameter, at a moderate cost.

It is among the objects of this invention to provide a chuck comprising a body member and a pressure member axially movable relative to the body member, the members having relatively inclined surfaces adapted to engage a collet, a plurality of screws rotatable about mutually spaced axes interconnecting the members, and a flexible driving element interconnecting the screws for simultaneous actuation thereof. It is contemplated that at least one of the screws be provided with wrench engaging means for effecting the simultaneous actuation of the screws collectively and preferably each of the screws is provided with such wrench engaging means. The driving element is inextensible and preferably assumes the form of a roller chain for engagement with a sprocket secured to each of the screws. The number of screws exceeds two and their axes are preferably parallel. Where the invention is applied to a chuck for engaging the outer periphery of a work piece, the pressure member will preferably have an inner conical collet engaging surface. Where the chuck is intended to engage the internal periphery of a work piece, the pressure member will preferably have an outer conical collet engaging surface.

The body member preferably has a substantially plane collet engaging surface. The screws preferably threadedly engage the pressure member and rotate freely in the body member. Slack adjusting means for the flexible element is carried by the body member and where the flexible element is a roller chain, the adjusting means preferably assumes the form of a radially adjustable idler sprocket or multiple sprockets in engagement with the chain. The threads in the openings of the pressure member preferably begin at the same angular positions relative to radii extending from the chuck axis through the centers of the openings respectively, so that the pressure member can be assembled on the body member with any of the screws received in any of the openings.

It is also among the objects of the present invention to provide a chuck comprising a body member having a radial surface adapted to receive a collet, a pressure member having a divergent surface for engaging the collet slidably mounted with respect to the body member and collet, at least three parallel screws rotatably carried by the body member threadedly engaging the pressure member, a sprocket secured to each of the screws, a roller chain engaging the teeth of each of the sprockets, and wrench engaging means provided on at least one of the screws for adjusting the collet. Internally threaded bushings are preferably secured to the pressure member for threadedly receiving the screws.

A more complete understanding of the invention will follow a description of the accompanying drawings wherein:

Fig. 3 is a sectional elevation taken along line 3—3 of Fig. 2 on an enlarged scale;

Fig. 4 is a fragmentary sectional elevation on a further enlarged scale taken along line 4—4 of Fig. 2;

Fig. 5 is a fragmentary sectional elevation, on an enlarged scale, depicting a modified bushing and retainer; and Fig. 6 is a fragmentary sectional elevation on an enlarged scale depicting a modification embodying the present invention assuming the form of an internal chuck.

Figure 1:
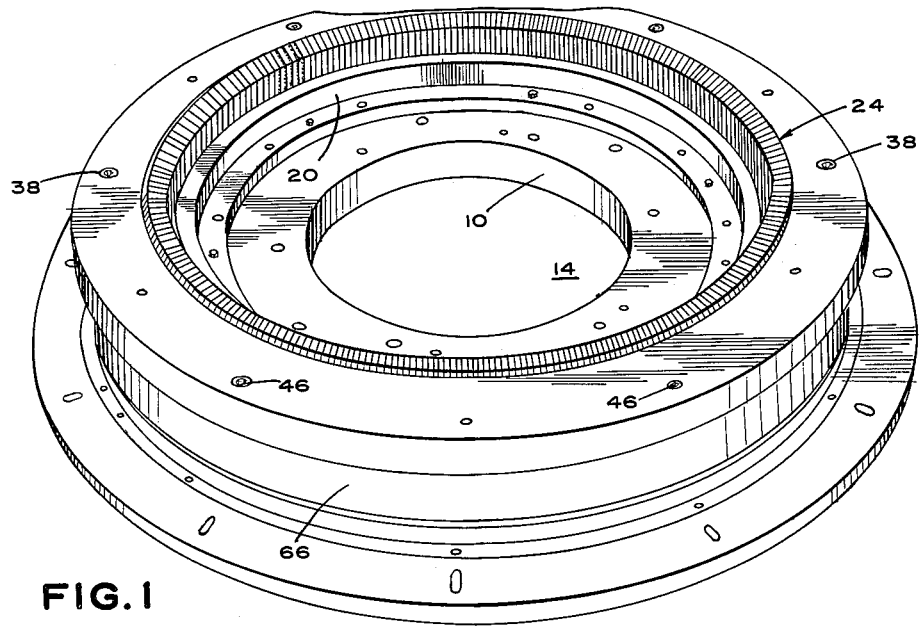
Fig. 1 is a perspective view of a chuck embodying the present invention.

The base plate 10 of the chuck depicted in the drawings has its lower surface 12 in engagement with the face plate 14 of a lathe or other machine with which the chuck is to be used. The upper surface 16 of the base plate 10 engages the lower surface 18 of a body member 20 which is suitably bolted to the base member. The upper surface 22 of the body member 20 is plane and serves as an abutment for the jaws of a collet 24. The collet may assume a variety of forms including that disclosed in the patent to Haviland, No. 2,855,206, dated October 7, 1958. The outer peripheral edges 26 of the collet jaws are inclined with respect to the chuck axis 28 for cooperation with a conical internal surface 30 formed on the ring or pressure member 32.

The ring or pressure member 32 is maintained in alignment with the body member 20 and base plate 10 by means of dowel pins 34, shown in Fig. 4, which are pressed into the base plate 10 so as to be relatively fixed thereto while slidably engaging openings 36 formed in the pressure member 32. Relative axial movement between the body member 20 and the pressure member 32 is effected by three or more screws 38 whose heads 40 lie in the plane of the lower surface 12 of the base plate 10, and whose opposite ends are provided with threads 42 received by the internal threads of bushings 44 which are secured in fixed relationship with the pressure member in an appropriate manner. The threaded end of each screw 38 contains a socket 46 for the reception of a wrench.

Figure 2:
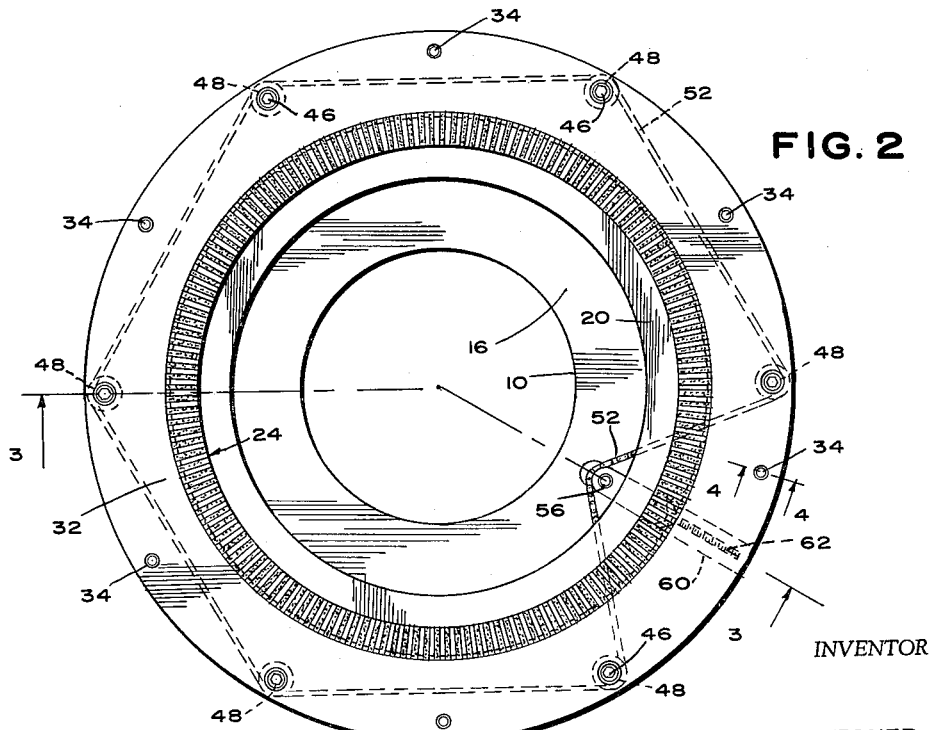
Fig. 2 is a plan view of a chuck embodying the present invention.

An intermediate portion of each of the screws 38 has a sprocket 48 secured thereto by means of a Woodruff key 50. A roller chain 52, as best shown in Fig. 2, engages the teeth of each of these sprockets so that by introduction of a wrench or key into the socket 46 of any of the screws, rotation of the wrench will effect simultaneous and equal rotation of the screws 38. The roller chain 52 is shown as an endless chain, and in order to adjust the slack, a radially adjustable idler sprocket 54 is provided, rotatably mounted by means of a shaft 56 mounted in a carriage 58 received in a radial groove 60 formed in the base plate 10 and adjustable in a radial direction by means of a screw 62 threadedly received by the body member 20 and containing a socket 64 for the reception of a suitable wrench. A suitable housing 66 of annular form for protecting the chain and sprockets provides an opening 68 in registry with the socket 64 of the screw 62 so that the slack can be adjusted readily. It is contemplated that two or more such adjustable idler sprockets be provided if desired and where two such idler sprockets are employed, they will preferably be diametrically disposed.

In a chuck embodying the present invention, where only three screws 38 are employed, it is possible to eliminate the bushings 44 and provide the threads directly through the pressure member 32. Where more than three screws are used however, it is necessary that the bushings 44 be adjusted so that they are all equally loaded at all times. This may be accomplished by introducing gauge blocks between the lower surface 68 of the pressure member 32 and the upper shoulder 70 of the body member 20 whereupon the bushings 44 are equally tightened, as with a torque wrench, and locked in place by the use of adhesive or otherwise. The use of adhesive is contemplated in the form of the invention depicted in Fig. 3 for securing the bushings 44 in fixed relationship with the pressure member 32. In this figure, the collet is depicted in almost its fully contracted condition. Thus it will be apparent that the pressure member 32 will never bottom on the body member 20. When it is desired to effect expansion of the collet, a wrench will be introduced into a socket 46 of one of the screws 38 and rotated in the proper direction to produce separative movement of the pressure member 32 with respect to the body member 20. In this connection, it will be noted that thrust in both directions is absorbed by the heads 40 of the screws 38 which are in bearing relationship with both the base plate 10 and the face plate 14.

A chuck of the type shown in the drawings is readily adapted for power operation by the use of a motor and driving sprocket for the roller chain. Whereas the collet jaws have been depicted as resting on a horizontal plane surface provided by the body member 20, and whereas such an orientation is desirable in connection with chucks of such large sizes that the weight of the jaws is appreciable and the force produced by displacement of the rubber between the jaws is insufficient to retain the jaws in place or retract them if inverted, it is contemplated that in other cases, the chuck be employed with its axis at any desired angle including the horizontal position.

A chuck of the type thus far described has been used very successfully for work pieces assuming the form of thin walled metallic cylinders and cones and also for plastic materials, in each case the lower ends of the work pieces having been engaged by the collet. Where it is desired to introduce a work piece farther into the collet, the internal bores of the body member and the base plate can be enlarged sufficiently so as to be not less than the internal diameter of the collet in its expanded condition. After the base plate 10 has been centered with respect to the face plate 14 of the machine for which the chuck is intended the chuck can be secured to the face plate for rotation therewith.

The structure depicted in Fig. 5 differs from that of Fig. 3 primarily in the form of the bushing and the arrangement for retaining it. In Fig. 5, the bushing 72 is provided with an upper flange 74 received within a complementary opening 76 formed in the pressure member 32 to correspond with each of the screws 38. The pressure member is also tapped from its upper surface to provide threaded openings 78 for the reception of screws 80 whose heads 82 are received within an annular retainer 84 for clamping the bushings 72 in their respective adjusted positions to assure synchronous operation of the screws 38 and axial movement of the pressure member 32 relative to the body member 20 so as to assure proper operation of the collet 24.

In Fig. 6 the invention has been depicted as applied to an internal chuck wherein the collet 86 engages the inner periphery of a work piece 88. In this case, it is the outer periphery 90 of the pressure member 92 that is conical to engage the internal inclined edges 94 of the collet jaws 96. A plate 98 secured to the body member 20 by means of screws 100 is provided with openings 102 to serve as upper guides for the screws 38. In this case, the screws are received by another type of bushing 104 each of which has an intermediate flange 106 providing a lower shoulder 108 engaging the pressure member and an upper shoulder 110 engaged by a shoulder 112 of a retainer ring 114 which is secured to the pressure member 92 by means of screws 116 for clamping the bushing 104 in its proper adjusted position. A plane horizontal surface 118 is provided by the body member 20 to serve as an abutment for the collet jaws 96 and to prevent damage to the jaws, a rubber annulus 120 surrounds the jaws to prevent their engagement with the inner peripheral surface 122 of the body member 20 surrounding the jaws. It will be understood that the pressure member or the body member of the chuck in accordance with any of the modifications may be inclined with respect to the chuck axis, and as a matter of fact, surfaces of both the pressure member and the body member may be inclined with respect to the chuck axis to produce the desired expansion and contraction of the collet.

Whereas only a few embodiments of the present invention have been described with reference to the accompanying drawings, such variations as will occur to those skilled in the art are contemplated by the appended claims.

I claim:

1. A chuck comprising a body member and a pressure member axially movable relative to said body member, said members having relatively inclined surfaces adapted to engage a collet, a plurality of screws rotatable about mutually spaced axes interconnecting said members, and a flexible driving element interconnecting said screws for simultaneous actuation thereof.

2. A chuck as set forth in claim 1 wherein one of said screws is provided with wrench engaging means.

3. A chuck as seta forth in claim 1 wherein each of said screws is provided with wrench engaging means.

4. A chuck as set forth in claim 1 wherein said driving element is inextensible.

5. A chuck as set forth in claim 1 wherein said driving element is a chain.

6. A chuck as set forth in claim 1 wherein a sprocket is secured to each of said screws and a chain interconnects said sprockets.

7. A chuck as set forth in claim 1 wherein each of said screws has a toothed element secured thereto and in engagement with said flexible element.

8. A chuck as set forth in claim 1 wherein said screws are parallel.

9. A chuck as set forth in claim 1 wherein the number of said screws exceeds two.

10. A chuck as set forth in claim 1 wherein said driving element is an endless chain.

11. A chuck as set forth in claim 1 wherein said pressure member has an inner conical collet engaging surface.

12. A chuck as set forth in claim 1 wherein said pressure member has an outer conical collet engaging surface.

13. A chuck as set forth in claim 1 wherein said body member has a substantially plane collet engaging surface.

14. A chuck as set forth in claim 1 wherein said screws threadedly engage said pressure member and rotate freely in said body member.

15. A chuck as set forth in claim 1 wherein said body member carries slack adjusting means for said flexible element.

16. A chuck as set forth in claim 1 wherein said flexible element is a chain and said body member carries a radially adjustable idler sprocket in engagement with said chain for slack control.

17. A chuck as set forth in claim 1 wherein said pressure member provides threaded openings to receive said screws, the threads of said openings beginning at the same angular positions relative to radii extending from the chuck axis through the centers of said openings respectively, whereby said pressure member can be assembled on said body member with any of said screws received in any of said openings.

18. A chuck comprising a body member having a radial surface adapted to receive a collet, a pressure member having a divergent surface for engaging said collet slidably mounted with respect to said body member and collet, at least three parallel screws rotatably carried by said body member threadedly engaging said pressure member, a sprocket secured to each of said screws, a roller chain engaging the teeth of each of said sprockets, and wrench engaging means provided on at least one of said screws for adjusting said collet.

19. A chuck as set forth in claim 18 wherein internally threaded bushings secured to said pressure member threadedly receive said screws.

References Cited in the file of this patent

UNITED STATES PATENTS

| | | |
|---|---|---|
| 2,377,991 | Carlson | June 12, 1945 |
| 2,865,150 | Fuglie | Dec. 23, 1958 |